US011631288B2

(12) United States Patent
Nakhjavani

(10) Patent No.: US 11,631,288 B2
(45) Date of Patent: Apr. 18, 2023

(54) MAINTENANCE PREDICTION SYSTEM FOR A VEHICLE

(71) Applicant: The Boeing Company, Chicago, IL (US)

(72) Inventor: Omid B Nakhjavani, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 437 days.

(21) Appl. No.: 16/788,959

(22) Filed: Feb. 12, 2020

(65) Prior Publication Data

US 2021/0248845 A1    Aug. 12, 2021

(51) Int. Cl.
*B64F 5/60* (2017.01)
*G07C 5/08* (2006.01)
*B64F 5/40* (2017.01)
*G06T 19/00* (2011.01)
*G06N 20/00* (2019.01)
*G06T 7/00* (2017.01)
*B64D 45/00* (2006.01)

(52) U.S. Cl.
CPC .............. *G07C 5/0825* (2013.01); *B64F 5/40* (2017.01); *B64F 5/60* (2017.01); *G06N 20/00* (2019.01); *G06T 7/001* (2013.01); *G06T 19/003* (2013.01); *B64D 2045/0085* (2013.01)

(58) Field of Classification Search
CPC ............ G07C 5/0825; B64F 5/60; B64F 5/40; G06N 20/00; G06T 7/001; G06T 19/003; B64D 2045/0085
See application file for complete search history.

(56) References Cited

U.S. PATENT DOCUMENTS

| 10,360,601 B1* | 7/2019 | Adegan ............... G06Q 30/0283 |
| 2017/0273639 A1* | 9/2017 | Iscoe ....................... G06N 20/00 |
| 2019/0065989 A1* | 2/2019 | Kida .................... G06N 3/0481 |

FOREIGN PATENT DOCUMENTS

WO    WO-2019092248 A1 *    5/2019    .......... B61L 27/0077

\* cited by examiner

*Primary Examiner* — Vivek D Koppikar
*Assistant Examiner* — Jeffrey R Chalhoub
(74) *Attorney, Agent, or Firm* — Vivacqua Crane, PLLC

(57) ABSTRACT

A maintenance prediction system for generating one or more recommended actions for an individual to perform upon a vehicle is disclosed, and includes a camera configured to capture image data of one or more components of interest and image data of one or more body size parameters of the individual. The maintenance prediction system also includes one or more assembly databases storing three-dimensional model data representing components of the vehicle, one or more processors in electronic communication with the camera and the one or more assembly databases, and a memory coupled to the one or more processors. The maintenance prediction system generates one or more notifications indicating the recommended actions for the individual to perform upon the vehicle.

20 Claims, 5 Drawing Sheets

MAINTENANCE PREDICTION SYSTEM FOR A VEHICLE

INTRODUCTION

The present disclosure relates to a maintenance prediction system for a vehicle. More specifically, the present disclosure is directed towards a maintenance prediction system generating one or more recommended actions for an individual to perform upon a vehicle.

BACKGROUND

There is an ever-increasing demand for air travel. As a result, airlines may require more mechanics and other maintenance personnel to accommodate the increased demand in air travel. However, there is a shortage of skilled mechanics and technicians in the airline industry. Furthermore, the level of skill, experience, and knowledge between various mechanics may vary, which may also create issues. Moreover, even if a mechanic is highly skilled and experienced, he or she may not have the necessary equipment or diagnostic tools required to make a repair or perform maintenance on the aircraft. Another factor compounding this issue is the transfer of knowledge and processes to maintenance personnel, which relies heavily upon a non-scalable human component.

The shortage of mechanics and other maintenance personnel may be especially pronounced in regions that have extreme weather conditions. For example, maintenance personnel may not be readily available in areas having extremely hot temperatures such as the gulf cooperation council (GCC) regions or, alternatively, areas that experience extremely cold temperatures such as, for example, Alaska. As a result, if an aircraft experiences issues in an area having extreme weather conditions, this may result in significant delays, money lost by the airline, and disruptions to the end customers.

SUMMARY

According to several aspects, a maintenance prediction system for generating one or more recommended actions for an individual to perform upon a vehicle is disclosed. The maintenance prediction system includes a camera configured to capture image data of one or more components of interest and image data of one or more body size parameters of the individual and one or more assembly databases storing three-dimensional model data representing components of the vehicle. The maintenance prediction system also includes one or more processors in electronic communication with the camera and the one or more assembly databases and a memory coupled to the one or more processors. The memory stores data into one or more databases and program code that, when executed by the one or more processors, causes the maintenance prediction system to receive one or more travel parameters of the vehicle, one or more operating conditions of the vehicle, and weather conditions. The system also determines, based on the image data of the one or more components of interest, the image data of the one or more body size parameters of the individual, and the three-dimensional model data stored in the assembly databases, the individual is sized to access the one or more components of interest. The system also determines a failure mode of the one or more components of interest based on the one or more travel parameters of the vehicle, the one or more operating conditions of the vehicle, the weather conditions, and the one or more body size parameters of the individual. The system selects the one or more recommended actions based on at least the failure mode of the one or more components of interest and generates one or more notifications indicating the recommended actions for the individual to perform upon the vehicle.

In another aspect, a maintenance prediction system for generating one or more recommended actions for an individual to perform upon an aircraft is disclosed. The maintenance prediction system includes a camera configured to capture image data of one or more components of interest and image data of one or more body size parameters of the individual, one or more assembly databases storing three-dimensional model data representing components of the aircraft, and one or more maintenance databases storing an aircraft maintenance manual that corresponds to a specific make and model of the aircraft. The system also includes one or more processors in electronic communication with the camera and the one or more assembly databases and a memory coupled to the one or more processors. The memory stores data into one or more databases and program code that, when executed by the one or more processors, causes the maintenance prediction system to receive one or more travel parameters of the aircraft, one or more operating conditions of the aircraft, and weather conditions and determine, based on the image data of the one or more components of interest, the image data of the one or more body size parameters of the individual, and the three-dimensional model data stored in the assembly databases, the individual is sized to access the one or more components of interest. The system determines a failure mode of the one or more components of interest based on the one or more travel parameters of the aircraft, the one or more operating conditions of the aircraft, the weather conditions, and the one or more body size parameters of the individual. The system also selects the one or more recommended actions from the aircraft maintenance manual based on at least the failure mode of the one or more components of interest. Finally, the system generates one or more notifications indicating the recommended actions for the individual to perform upon the aircraft.

In still another aspect, a method of generating one or more recommended actions for an individual to perform upon a vehicle by a maintenance prediction system is disclosed. The method includes capturing, by a camera, image data of one or more components of interest and image data of one or more body size parameters of the individual. The method further includes receiving one or more travel parameters of the vehicle, one or more operating conditions of the vehicle, and weather conditions. The method further includes determining, based on the image data of the one or more components of interest, the image data of the one or more body size parameters of the individual, and three-dimensional model data stored in one or more assembly databases, the individual is sized to access the one or more components of interest. The method also includes determining, by a computer, a failure mode of the one or more components of interest based on the one or more travel parameters of the vehicle, the one or more operating conditions of the vehicle, the weather conditions, and the one or more body size parameters of the individual. The method also includes selecting, by the computer, the one or more recommended actions based on at least the failure mode of the one or more components. Finally, the method includes generating one or more notifications indicating the recommended actions for the individual to perform upon the vehicle.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a maintenance prediction system configured to generate one or more recommended actions for an individual to perform upon the vehicle. The disclosed maintenance prediction system employs machine learning techniques to determine a failure mode and selects the recommended actions from an electronic version of a vehicle maintenance manual. Thus, the disclosed maintenance prediction system provides an automated approach for performing maintenance and repairs upon a vehicle. In contrast, conventional approaches to diagnose a vehicle typically rely upon an individual, such as a maintenance technician or a mechanic, to determine which corrective actions or repairs to perform upon a vehicle.

The following description is merely exemplary in nature and is not intended to limit the present disclosure, application, or uses.

Figure 1:
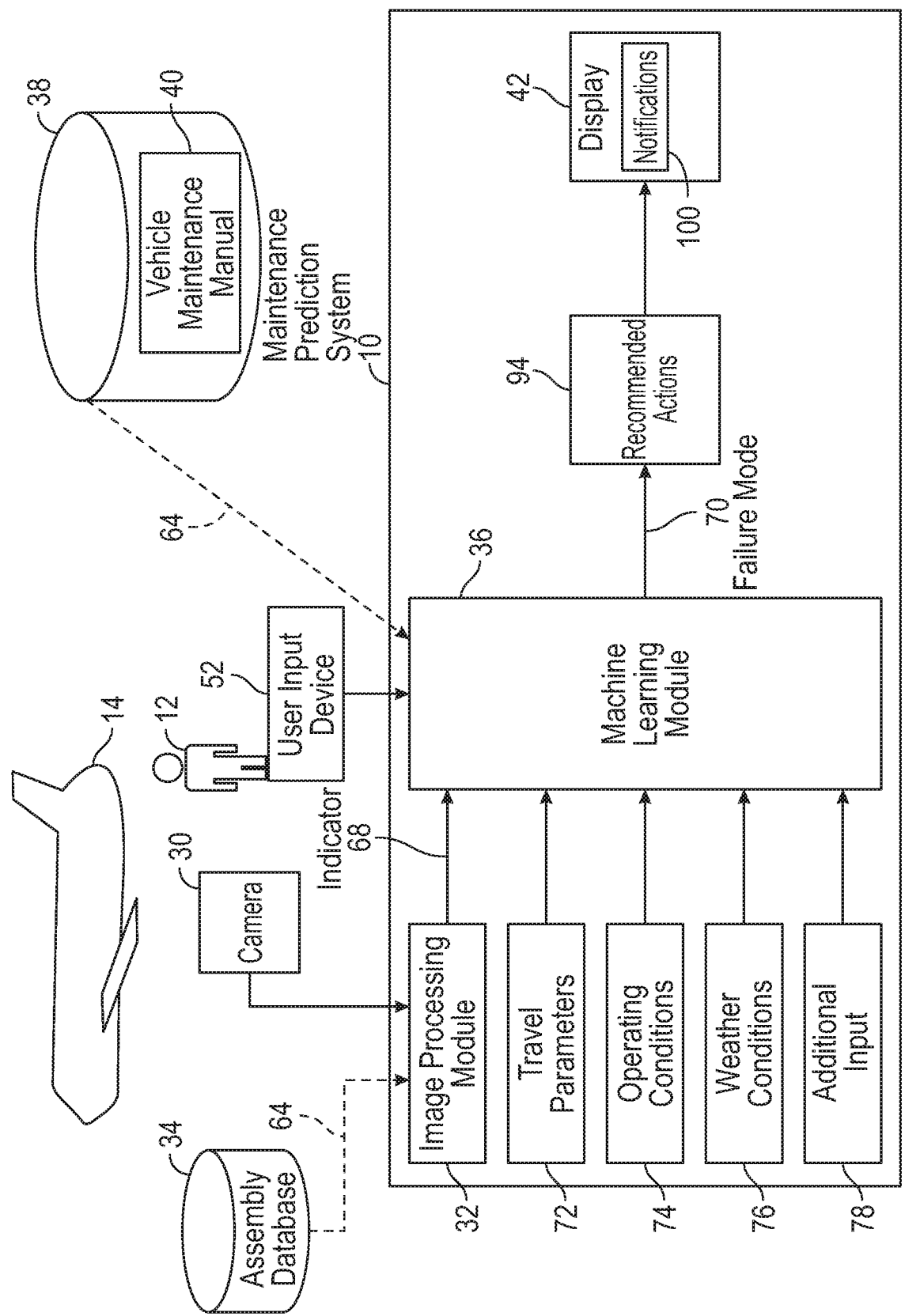
FIG. 1 is a schematic diagram of the disclosed maintenance prediction system, an aircraft, and one or more maintenance technicians, according to an exemplary embodiment.

Referring to FIG. 1, a maintenance prediction system 10 for generating one or more recommended actions for an individual 12 to perform upon a vehicle 14 is illustrated. In the embodiment as shown in FIG. 1, the vehicle 14 is an aircraft. However, it is to be appreciated that the vehicle 14 is not limited to an aircraft and any other type of vehicle may be used as well such as, for example, an automobile, a drone, or an autonomous vehicle. The maintenance prediction system 10 includes a camera 30, an image processing module 32, one or more assembly databases 34, a machine learning module 36, one or more maintenance databases 38 storing a vehicle maintenance manual 40, and a display 42. In an embodiment, the individual 12 is a maintenance technician or other personnel responsible for performing maintenance and corrective actions on the vehicle 14. As explained below, the maintenance prediction system 10 provides guidance to the individual 12 during maintenance and repair procedures.

Figure 5:
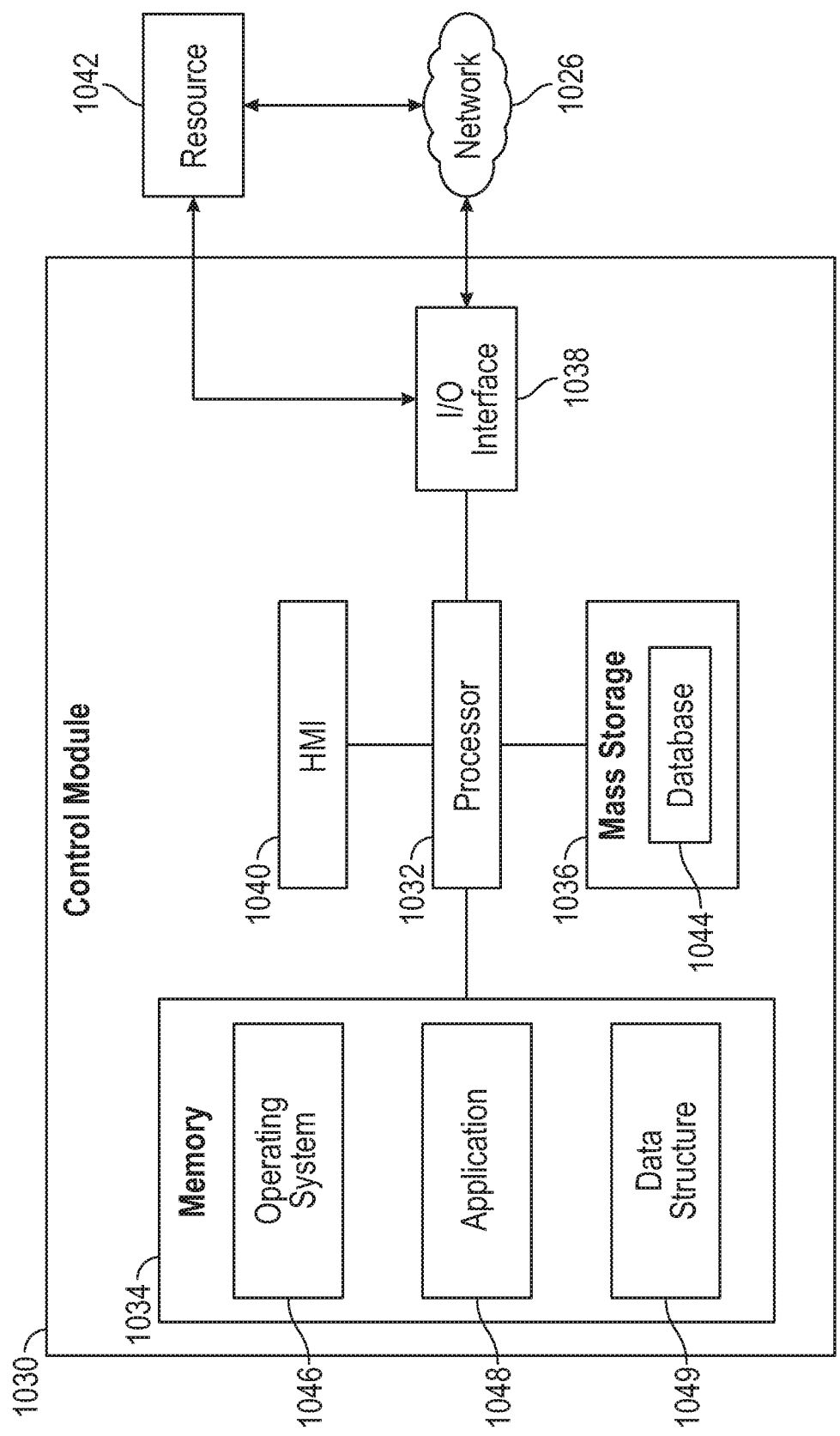
FIG. 5 is an exemplary computer system used by the maintenance prediction system shown in FIG. 1, according to an exemplary embodiment.

The maintenance prediction system 10 is any type of computing device including one or more processors 1032 (FIG. 5). For example, in one embodiment, the maintenance prediction system 10 is a handheld electronic device such as, but not limited to, a tablet computer or a smartphone, and the display 42 is a touchscreen. The camera 30 is any type of device configured to capture image data. It is to be appreciated that the image data is in the form of one or more static images, one or more dynamic images, or both static and dynamic images. For example, the image data may be in the form of one or more photographs, one or more videos, or a combination of both. In one embodiment, the camera 30 is an infrared thermal imaging camera, and the image data captured by the camera 30 includes thermal imaging data. Accordingly, the maintenance prediction system 10 is configured to detect when one or more of the components of interest 50 are heated to an elevated temperature. For example, in one embodiment, the maintenance prediction system 10 informs the individual 12 that one or more components of interest 50 (FIG. 2) are hot to the touch.

Figure 2:
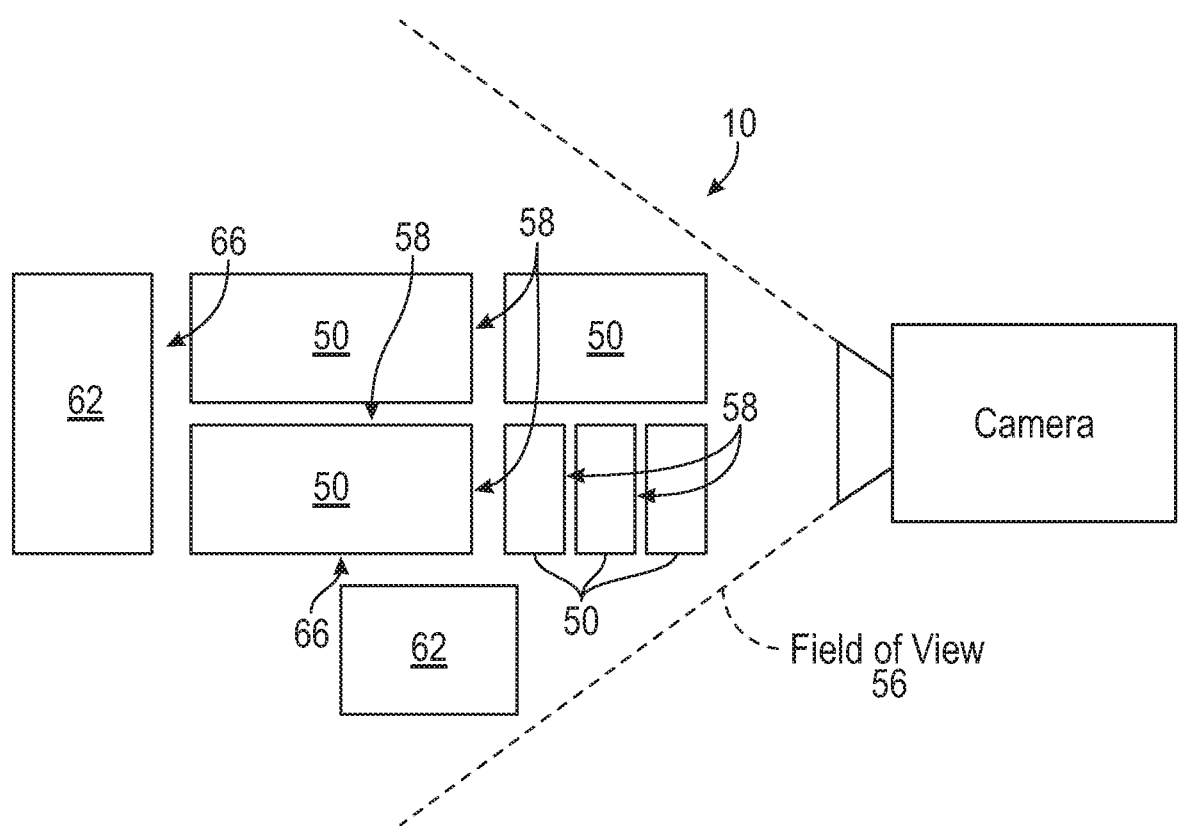
FIG. 2 is a schematic diagram of the camera and a plurality of components of interest of the aircraft, according to an exemplary embodiment.

Referring to FIG. 2, the camera 30 configured to capture image data representing one or more components of interest 50 of the vehicle 14 and one or more body size parameters of the individual 12 (FIG. 1). The one or more components of interest 50 represent components that the individual 12 is planning to perform repair or maintenance upon. For example, if the vehicle 14 is an aircraft, then the one or more components of interest 50 are aircraft components. In the example as shown in FIG. 2, the camera 30 includes a field of view 56. Items placed within the field of view 56 of the camera 30 are part of the image data captured by the camera 30.

Referring to both FIGS. 1 and 2, it is to be appreciated that some individuals may not be able to perform repair on maintenance on certain systems or components because of their body size parameters. Specifically, in one example, an individual's hands may be too large to fit inside a space between two components of the vehicle 14. Similarly, in another example, the individual 12 may not be able to access another area of the vehicle 14 depending on his or her height and weight. Therefore, the maintenance prediction system 10 is configured to determine if the individual 12 is small enough or large enough to access the components of interest 50. As such, one of the body size parameters is hand size. Other examples of body size parameters include, but are not limited to, height of the individual, and weight of the individual.

Referring to FIG. 1, the image processing module 32 receives the image data representing one or more components of interest 50 and one or more body size parameters of the individual 12. The image processing module 32 is also in electronic communication with the one or more assembly databases 34. The assembly databases 34 may be stored by a memory of the maintenance prediction system 10 (seen in FIG. 5). Alternatively, in another embodiment, the assembly databases 34 are located remotely and are in electronic communication with the image processing module 32 by a wireless connection 64. The assembly databases 34 stores three-dimensional model data representing the components of the vehicle 14 as well as the various distances between the various components of the vehicle 14. In an embodiment, the three-dimensional data is shell mesh data including the mid-plane surface of the various components of the vehicle 14.

The image processing module 32 is configured to determine if the individual 12 is sized to access the components of interest 50 based on the image data representing the components of interest 50, the image data representing the body size parameters of the individual 12, and the three-dimensional model data stored by the assembly databases 34. The image processing module 32 employs one or more image processing techniques such as, for example, convolutional neural networks. Specifically, the image processing module 32 is configured to identify the objects represented by the image data collected by the camera 30. For example, if the camera 30 captures image data representing the landing gear of an aircraft and image data representing a hand of the individual 12, then the image processing module 32 employs image processing techniques to identify the objects represented by the image data collected by the camera 30 as the landing gear and the hands of the individual 12.

Once the image processing module 32 identifies the components of interest 50 represented by the image data, then the three-dimensional model data representing the components of interest 50 are retrieved from the assembly databases 34. In an embodiment, the three-dimensional model data also includes periphery components 62 surrounding the components of interest 50. The image processing module 32 then determines any spaces 58 that are located between the components of interest 50, as well as spaces 66 located between components of interest 50 and the periphery components 62.

Referring to both FIGS. 1 and 2, the image processing module 32 then determines if the individual 12 is sized to access the components of interest 50 based on the spaces 58 that are located between the components of interest 50, the spaces 66 located between components of interest 50 and the periphery components 62, and the body size parameters of the individual 12. For example, in an embodiment, the image processing module 32 determines the hand of the individual 12 is too large to fit in one or more of the spaces 58 located between the components of interest 50. In response to determining the individual 12 is not sized to access the component of interest 50, the image processing module 32 of the maintenance prediction system 10 instructs the display 42 to generates one or more notifications informing the individual 12 that he or she may not be able to perform maintenance or repair.

However, in response to determining the individual is sized to access the components of interest 50, the image processing module 32 generates an indicator 68 that is sent to the machine learning module 36. The indicator 68 informs the machine learning module 36 that the individual 12 is able to perform work on the one or more components of interest 50. The indicator 68 also includes the based on the image data representing the components of interest 50, the image data representing the components of interest 50, the spaces 58 that are located between the components of interest 50, the spaces 66 located between components of interest 50 and the periphery components 62, and the body size parameters of the individual 12.

In one embodiment, the image processing module 32 is configured to detect abnormalities that may not be visible to the human eye. For example, in an embodiment, the image processing module 32 detects cracks located in one of the components of interest 50 that would otherwise be undetected by the individual 12. The indicator 68 also includes information related to the abnormalities that are detected by the image processing module 32. In an embodiment the image processing module 32 detects any sharp edges along the components of interest 50 of the vehicle 14. In another embodiment, the image processing module 32 also determines surfaces that are either disposed along the components of interest 50 or nearby the components of interest 50 that are heated to elevated temperatures.

The machine learning module 36 determines a failure mode 70 of the one or more components of interest 50 in response to receiving the one or more indicators 68 from the image processing module 32. The failure mode 70 of the one or more components of interest 50 represents a vehicle issue that the individual 12 is attempting to remedy. For example, if the one or more components of interest 50 include a head gasket for an internal combustion engine that is part of an automobile, then the failure mode may indicate "blown head gasket" if the head gasket is compromised. In another example, if the components of interest 50 are not damaged or inoperable, then the failure mode 70 indicates a maintenance procedure that is required by the one or more components of interest 50.

In addition to body size parameters, there are other operator-related variables that affect the ability of the individual 12 to perform repairs and maintenance on the vehicle 14. For example, in an embodiment, the individual 12 enters operator capability information using a user input device 52. The user input device 52 may include electronic devices such as, for example, a keyboard, a touchscreen, or a microphone. The operator capability information indicates various characteristics of an individual such as, but not limited to, tool availability, skill level, and resource type. The tool availability indicates if the individual 12 has access to tools such as, for example, a wrench, screwdriver, or a diagnostic tool. The skill level of the individual 12 is determined based on factors such as, for example, years of experience, certifications, training, and relevant educational level. The resource type indicates skills or experience that may only be available in some specific locations. For example, some maintenance technicians in only some specific airports may have a particular skillset. The operator-related parameters are input to the machine learning module 36.

The failure mode 70 is determined based on the image data representing the components of interest 50, the image data representing the components of interest 50, the operator-related variables, one or more travel parameters 72 of the vehicle 14, one or more operating conditions 74 of the vehicle 14, and weather conditions 76. Specifically, the machine learning module 36 determines the failure mode 70 based on one or more machine learning process that are explained below and shown in FIG. 3. The machine learning module 36 receives the travel parameters 72 of the vehicle 14, the operating conditions 74 of the vehicle 14, and weather conditions 76 as input from a variety of various sources. For example, in an embodiment, the weather conditions 76 may be detected by sensors (not shown) that are part of the vehicle 14. In another example, the weather conditions 76 are input manually by the individual 12 using the user input device 52.

The travel parameters 72 represent variables that relate to where the vehicle 14 is traveling to and from. In an embodiment, the travel parameters 72 include one or more of the following: an origin, a destination, an estimated travel time, and a distance. The operating conditions 74 of the vehicle 14 indicate variables such as pressure and temperature experienced by various components of the vehicle 14. For example, in one embodiment, the operating conditions 74 of the vehicle 14 include one or more of the following: oil temperature, ambient temperature, and altitude. The weather conditions 76 indicate ambient conditions surrounding the vehicle 14. In an embodiment, the weather conditions 76 include ambient temperature, relative humidity, dew point, air pressure, precipitation, and sand. Specifically, the weather conditions 76 may indicate the presence of sand blowing in the air surround the vehicle 14.

It is to be appreciated that in one embodiment, the machine learning module 36 receives additional input 78 as well. For example, in one embodiment, the machine learning module 36 receives cost information. The cost information indicates expenses related to factors such as, but not limited to, replacement components and labor rates for the individual 12. In another embodiment, the machine learning module 36 receives timing constraints. For example, in one embodiment, there may only be a limited amount of time available to perform maintenance or repair to the vehicle 14. In still another embodiment, the machine learning module 36 receives accessibility information. The accessibility information may indicate, for example, that certain replacement vehicle components may not be available for several weeks.

Figure 3:
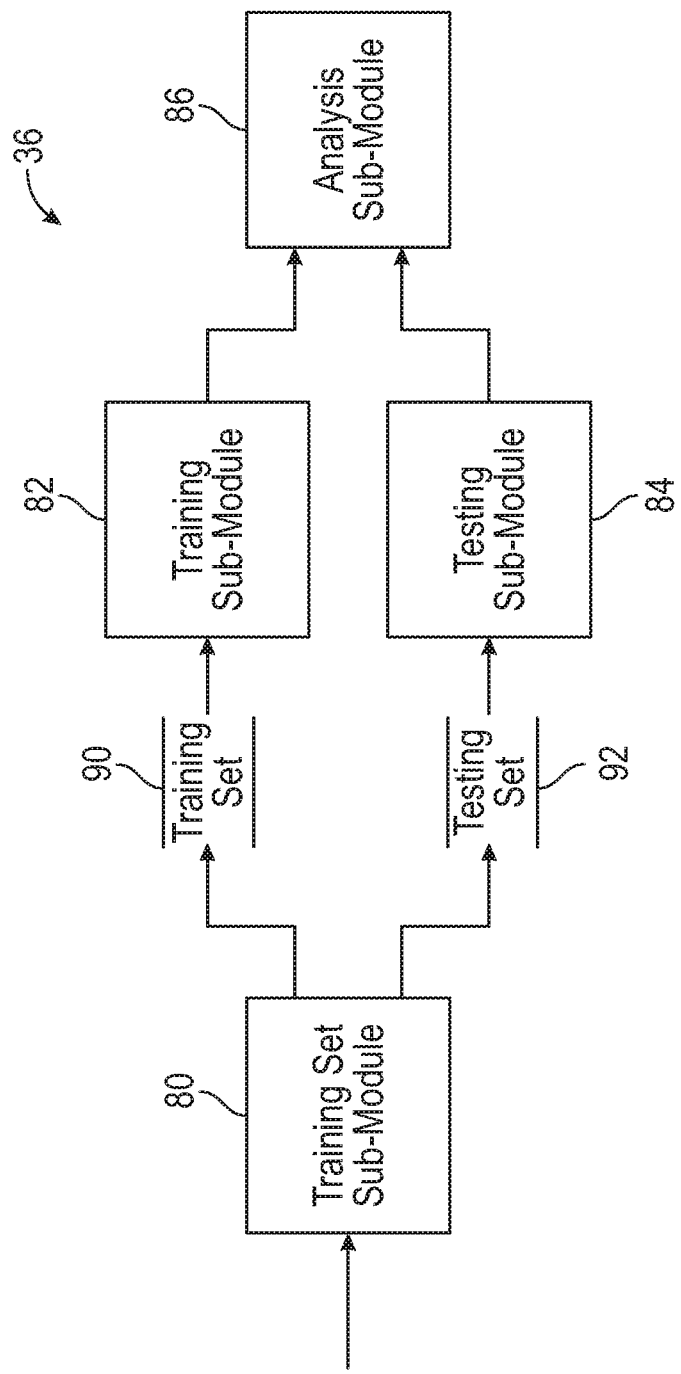
FIG. 3 is a schematic diagram of one embodiment of a machine learning module that is part of the maintenance prediction system, according to an exemplary embodiment.

FIG. 3 is a block diagram of the machine learning module 36. In the non-limiting embodiment as shown, the machine learning module 36 includes a training set sub-module 80, a training sub-module 82, a testing sub-module 84, and an analysis sub-module 86. The training set sub-module 80 receives the image data representing the components of interest 50, the image data representing the body size parameters of the individual 12, the operator-related variables, the one or more travel parameters 72 of the vehicle 14, the one or more operating conditions 74 of the vehicle 14, and the weather conditions 76 as input, and divides the input into two different sets of data. Specifically, the input is divided into a training set 90 and a test set 92. The training set 90 of data is used to build a model, and the test set 92 is used to validate the model. It is to be appreciated that in one embodiment the training set 90 and the test set 92 of data are oversampled during failure mode. The training sub-module 82 attempts to predict an output value (i.e., the failure mode 70) based on the training set 90 of data, and the testing sub-module 84 determines the accuracy of the training using the testing set 92 of data. The analysis sub-module 86 then determines the accuracy of the failure mode 70. For example, in one embodiment, the accuracy of the failure mode 70 is determined based on a receiver operating characteristic (ROC) curve.

Turning back to FIG. 1, the failure mode 70 is then used to determine one or more recommended actions 94. The recommended actions 94 are selected based on at least the failure mode 70 of the one or more components of interest 50 and represents one or more steps that a mechanic or technician performs to correct the failure mode 70. For example, if the failure mode 70 indicated that an air filter requires replacement, then the recommended actions 94 include the steps for removing the used air filter from the vehicle 14 and replacing the used air filter with a new air filter. The recommended actions 94 are selected from the vehicle maintenance manual 40 based on various machine learning algorithms. The vehicle maintenance manual 40 that corresponds to a specific make and model of the vehicle 14. The vehicle maintenance manual 40 is stored on the maintenance databases 38. Similar to the assembly database 34, the maintenance databases 38 may be stored by a memory 1034 of the maintenance prediction system 10 (seen in FIG. 5). Alternatively, in another embodiment, the maintenance databases 38 are in a remote location and are in electronic communication with the image processing module 32 by the wireless connection 64.

The vehicle maintenance manual 40 is an electronic database that includes procedural information to address the failure mode 70 of the one or more components of interest 50. For example, if the vehicle 14 is an automobile, then the vehicle maintenance manual 40 is a repair manual that is specific to the make, model, and model year of the automobile. In another embodiment, if the vehicle 14 is an aircraft, then the vehicle maintenance manual 40 is an aircraft maintenance manual specific to the make and model of the aircraft. In an embodiment, the aircraft maintenance manual may include videos, animations, and the like.

The maintenance prediction system 10 is configured to generate one or more notifications 100 indicating the one or more recommended actions 94 for the individual 12 to perform upon the vehicle 14. In one embodiment, the notifications 100 are shown upon the display 42 as text and graphics. For example, the notifications 100 may include written instructions as well as images that illustrate a procedure for repairing or maintaining the components of interest 50. In another embodiment, the one or more recommended actions 94 are shown upon the display 42 as a video. In one non-limiting embodiment, the display 42 may be part of an augmented reality system. For example, in one approach, the display 42 may be a pair of augmented reality glasses.

Figure 4:
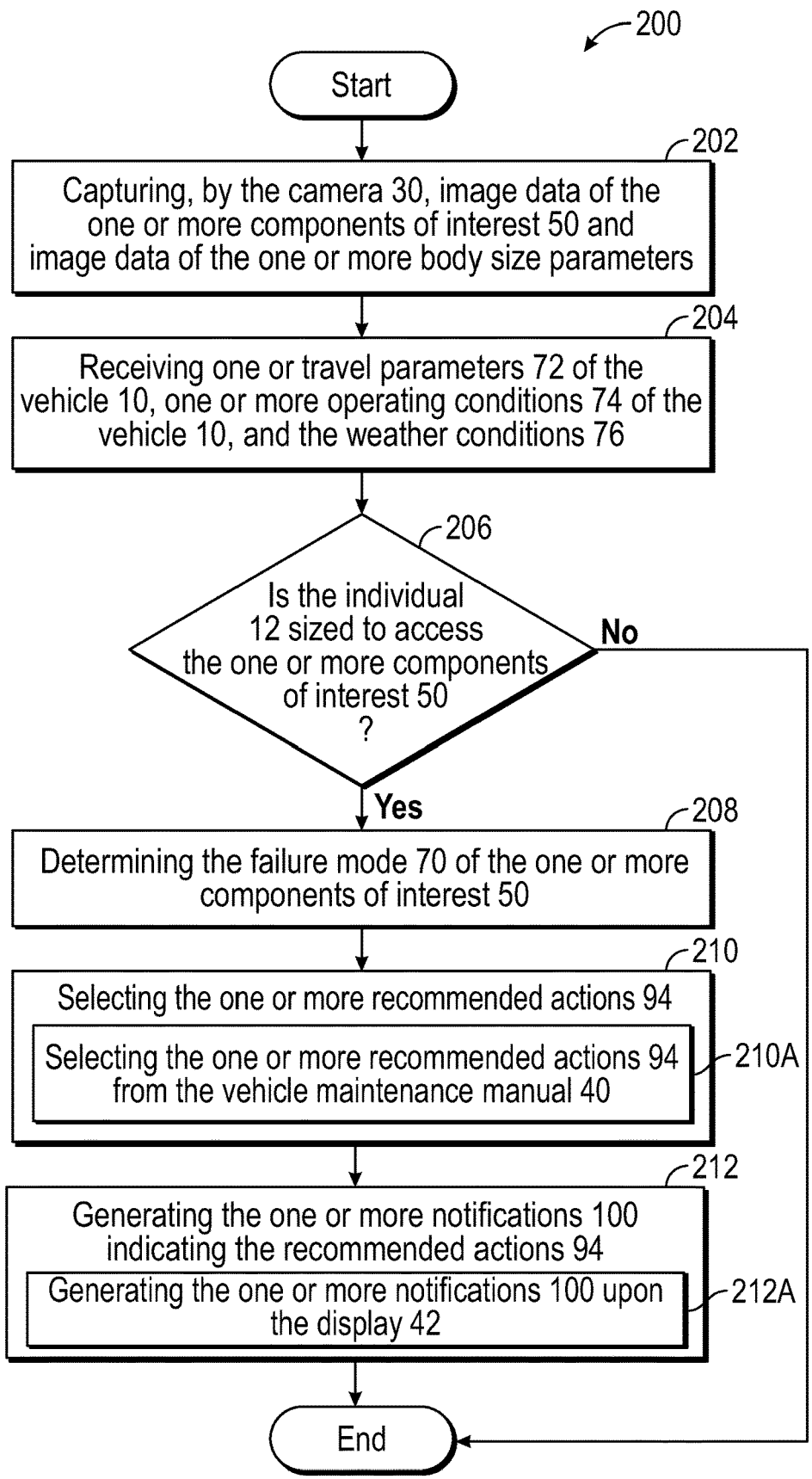
FIG. 4 is a process flow diagram illustrating a method for determining one or more recommended actions by the maintenance prediction system, according to an exemplary embodiment.

The individual 12 may repair or perform one or more maintenance procedures upon the vehicle 14 based on the one or more recommended actions 94 that are shown upon the display 42 as the one or more notifications 100. The one or more recommended actions 94 provide guidance to an individual when performing repairs and other maintenance procedures upon the vehicle 14. Thus, the maintenance prediction system 10 may improve efficiency by providing recommendations to maintenance personnel. Turing now to FIG. 4, an exemplary process flow diagram illustrating a method 200 for generating one or more recommended actions 94 for the individual 12 to perform upon the vehicle 14 by the maintenance prediction system 10.

Referring generally to FIGS. 1-4, the method 200 may begin at block 202. In block 202, the camera 30 captures the image data of the one or more components of interest 50 and image data of one or more body size parameters of the individual 12. The method 200 may then proceed to block 204.

In block 204, the maintenance prediction system 10 receives the one or more travel parameters 72 of the vehicle 14, one or more operating conditions 74 of the vehicle 14, and weather conditions 76. As seen in FIG. 1, in an embodiment the maintenance prediction system 10 receives additional inputs 78 as well. As mentioned above, some examples of the additional information include, but are not limited to, cost information, timing constraints, and accessibility information. The method 200 may then proceed to decision block 206.

In decision block 206, the image processing module 32 determines if the individual 12 is sized to access the one or more components of interest 50 of the vehicle 14. If the maintenance prediction system 10 determines the individual 12 is too large or too small to access the one or more components of interest 50, then the method 200 may terminate. The individual 12 may either find a tool or attempt to find another technician or maintenance personal.

However, in another embodiment, the maintenance prediction system 10 determines, based on the image data of the one or more components of interest 50, the image data of the one or more body size parameters of the individual 12, and the three-dimensional model data stored in one or more assembly databases 34, the individual 12 is sized to access the one or more components of interest 50. In this embodiment, the method 200 may proceed to block 208.

In block 208, the failure mode 70 of the one or more components of interest 50 of the vehicle 14 is determined based on the one or more travel parameters 72 of the vehicle 14, the one or more operating conditions 74 of the vehicle 14, the weather conditions 76, and the one or more body size parameters of the individual 12. As mentioned above, the failure mode 70 is determined based on one or more machine learning processes. The method 200 may then proceed to block 210.

In block 210, the maintenance prediction system 10 selects the one or more recommended actions 94 based on at least the failure mode 70 of the one or more components. Specifically, as seen in block 210A, in an embodiment the maintenance prediction system 10 selects the one or more recommended actions 94 from the vehicle maintenance manual 40. The method 200 may then proceed to block 212.

In block 212, the notifications 100 indicating the recommended actions 94 for the individual 12 to perform upon the vehicle 14 are generated. In the embodiment as shown in block 212A, in an embodiment the notifications 100 are shown upon the display 42. As mentioned above, the notifications 100 may be text, graphics, or a video. The method 200 may then terminate.

Referring generally to the figures, the disclosed maintenance prediction system provides various technical effects and benefits. Specifically, the maintenance prediction system provides an automated approach for performing maintenance and repairs upon a vehicle. In contrast, conventional approaches to diagnose a vehicle typically rely upon an individual, such as a maintenance technician or a mechanic, to determine which corrective actions or repairs to perform upon a vehicle. In contrast, the maintenance prediction system automates the decision making process currently performed by maintenance personnel and technicians, which in turn enhances efficiency and also addresses several challenges that presently experienced when employing conventional approaches for repairing and maintaining a vehicle.

Referring now to FIG. 5, the maintenance prediction system 10 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A maintenance prediction system for generating one or more recommended actions for an individual to perform upon a vehicle, the maintenance prediction system comprising:
   a camera configured to capture image data of one or more components of interest and image data of one or more body size parameters of the individual;
   one or more assembly databases storing three-dimensional model data representing components of the vehicle;
   one or more processors in electronic communication with the camera and the one or more assembly databases; and
   a memory coupled to the one or more processors, the memory storing data into one or more databases and program code that, when executed by the one or more processors, causes the maintenance prediction system to:
      receive one or more travel parameters of the vehicle, one or more operating conditions of the vehicle, and weather conditions;
      process, based on a convolutional neural network, the image data of the one or more components of interest, the image data of the one or more body size parameters of the individual, and the three-dimensional model data stored in the assembly databases to determine the individual is not sized to access the one or more components of interest;
      in response to determining the individual is not sized to access the one or more components of interest, generate one or more notifications informing the individual that he or she is unable to perform maintenance;
      process, based on a convolutional neural network, the image data of the one or more components of interest, the image data of the one or more body size parameters of the individual, and the three-dimensional model data stored in the assembly databases to determine the individual is sized to access the one or more components of interest;
      in response to determining the individual is sized to access the one or more components of interest, determine, based on one or more machine learning processes, a failure mode of the one or more components of interest by dividing the one or more travel parameters of the vehicle, the one or more operating conditions of the vehicle, the weather conditions, and the one or more body size parameters of the individual into a training set of data and a test set of data, wherein the training set of data is for building a model and the test set of data is for validating the model, and wherein the failure mode is predicted based on the training set of data and the test set of data determines an accuracy of the training set of data;
      select the one or more recommended actions based on at least the failure mode of the one or more components of interest; and
      generate one or more notifications indicating the recommended actions for the individual to perform upon the vehicle.

2. The maintenance prediction system of claim 1, further comprising:
   one or more maintenance databases storing a vehicle maintenance manual that corresponds to a specific make and model of the vehicle.

3. The maintenance prediction system of claim 2, wherein the vehicle maintenance manual includes procedural information to address the failure mode of the one or more components of interest.

4. The maintenance prediction system of claim 2, wherein the one or more processors execute instructions to:
   select the one or more recommended actions from the vehicle maintenance manual based on the failure mode of the one or more components of interest.

5. The maintenance prediction system of claim 1, further comprising:
   a display in electronic communication with the one or more processors.

6. The maintenance prediction system of claim 5, wherein the one or more recommended actions are shown upon the display as text and graphics.

7. The maintenance prediction system of claim 5, wherein the one or more recommended actions are shown upon the display as a video.

8. The maintenance prediction system of claim 1, wherein the image data of the one or more body size parameters of the individual includes a body size and a hand size of the individual.

9. The maintenance prediction system of claim 1, wherein the one or more travel parameters of the vehicle include one or more of the following variables: an origin, a destination, an estimated travel time, and a distance.

10. The maintenance prediction system of claim 1, wherein the one or more operating conditions of the vehicle include one or more of the following: oil temperature, ambient temperature, and altitude.

11. The maintenance prediction system of claim 1, wherein the weather conditions include one of more of the following: ambient temperature, relative humidity, dew point, air pressure, precipitation, and sand.

12. A maintenance prediction system for generating one or more recommended actions for an individual to perform upon an aircraft, the maintenance prediction system comprising:
   a camera configured to capture image data of one or more components of interest and image data of one or more body size parameters of the individual;
   one or more assembly databases storing three-dimensional model data representing components of the aircraft;
   one or more maintenance databases storing an aircraft maintenance manual that corresponds to a specific make and model of the aircraft;
   one or more processors in electronic communication with the camera and the one or more assembly databases; and
   a memory coupled to the one or more processors, the memory storing data into one or more databases and program code that, when executed by the one or more processors, causes the maintenance prediction system to:
      receive one or more travel parameters of the aircraft, one or more operating conditions of the aircraft, and weather conditions;
      process, based on a convolutional neural network, the image data of the one or more components of interest, the image data of the one or more body size parameters of the individual, and the three-dimensional model data stored in the assembly databases to determine the individual is not sized to access the one or more components of interest;

in response to determining the individual is not sized to access the one or more components of interest, generate one or more notifications informing the individual that he or she is unable to perform maintenance;

process, based on a convolutional neural network, the image data of the one or more components of interest, the image data of the one or more body size parameters of the individual, and the three-dimensional model data stored in the assembly databases to determine the individual is sized to access the one or more components of interest;

in response to determining the individual is sized to access the one or more components of interest, determine, based on one or more machine learning processes, a failure mode of the one or more components of interest by dividing the one or more travel parameters of the aircraft, the one or more operating conditions of the aircraft, the weather conditions, and the one or more body size parameters of the individual into a training set of data and a test set of data, wherein the training set of data is for building a model and the test set of data is for validating the model, and wherein the failure mode is predicted based on the training set of data and the test set of data determines an accuracy of the training set of data;

select the one or more recommended actions from the aircraft maintenance manual based on at least the failure mode of the one or more components of interest; and generate one or more notifications indicating the recommended actions for the individual to perform upon the aircraft.

13. The maintenance prediction system of claim 12, further comprising:
a display in electronic communication with the one or more processors.

14. The maintenance prediction system of claim 13, wherein the one or more recommended actions are shown upon the display as text and graphics.

15. The maintenance prediction system of claim 13, wherein the one or more recommended actions are shown upon the display as a video.

16. The maintenance prediction system of claim 12, wherein the image data of the one or more body size parameters of the individual includes a body size and a hand size of the individual.

17. A method of generating one or more recommended actions for an individual to perform upon a vehicle by a maintenance prediction system, the method comprising:
capturing, by a camera, image data of one or more components of interest and image data of one or more body size parameters of the individual receiving one or more travel parameters of the vehicle, one or more operating conditions of the vehicle, and weather conditions;

processing, based on a convolutional neural network, the image data of the one or more components of interest, the image data of the one or more body size parameters of the individual, and three-dimensional model data stored in one or more assembly databases to determine the individual is not sized to access the one or more components of interest;

in response to determining the individual is not sized to access the one or more components of interest, generating, by a computer, one or more notifications informing the individual that he or she is unable to perform maintenance;

processing, based on a convolutional neural network, the image data of the one or more components of interest, the image data of the one or more body size parameters of the individual, and the three-dimensional model data stored in the one or more assembly databases, to determine the individual is sized to access the one or more components of interest;

in response to determining the individual is sized to access the one or more components of interest, determining, by the computer based on one or more machine learning processes, a failure mode of the one or more components of interest by dividing the one or more travel parameters of the vehicle, the one or more operating conditions of the vehicle, the weather conditions, and the one or more body size parameters of the individual into a training set of data and a test set of data, wherein the training set of data is for building a model and the test set of data is for validating the model, and wherein the failure mode is predicted based on the training set of data and the test set of data determines an accuracy of the training set of data;

selecting, by the computer, the one or more recommended actions based on at least the failure mode of the one or more components; and generating one or more notifications indicating the recommended actions for the individual to perform upon the vehicle.

18. The method of claim 17, further comprising:
generating the one or more notifications upon a display that is part of the maintenance prediction system.

19. The method of claim 17, wherein the maintenance prediction system further comprises one or more maintenance databases storing a vehicle maintenance manual that corresponds to a specific make and model of the vehicle, and wherein the method further comprises:
selecting the one or more recommended actions from the vehicle maintenance manual based on the failure mode of the one or more components of interest.

20. The maintenance prediction system of claim 1, wherein the vehicle is one of the following: an aircraft, an automobile, a drone, and an autonomous vehicle.

* * * * *